April 14, 1964
W. HUNGATE
3,128,994
MIXING HEAD
Filed Feb. 27, 1961
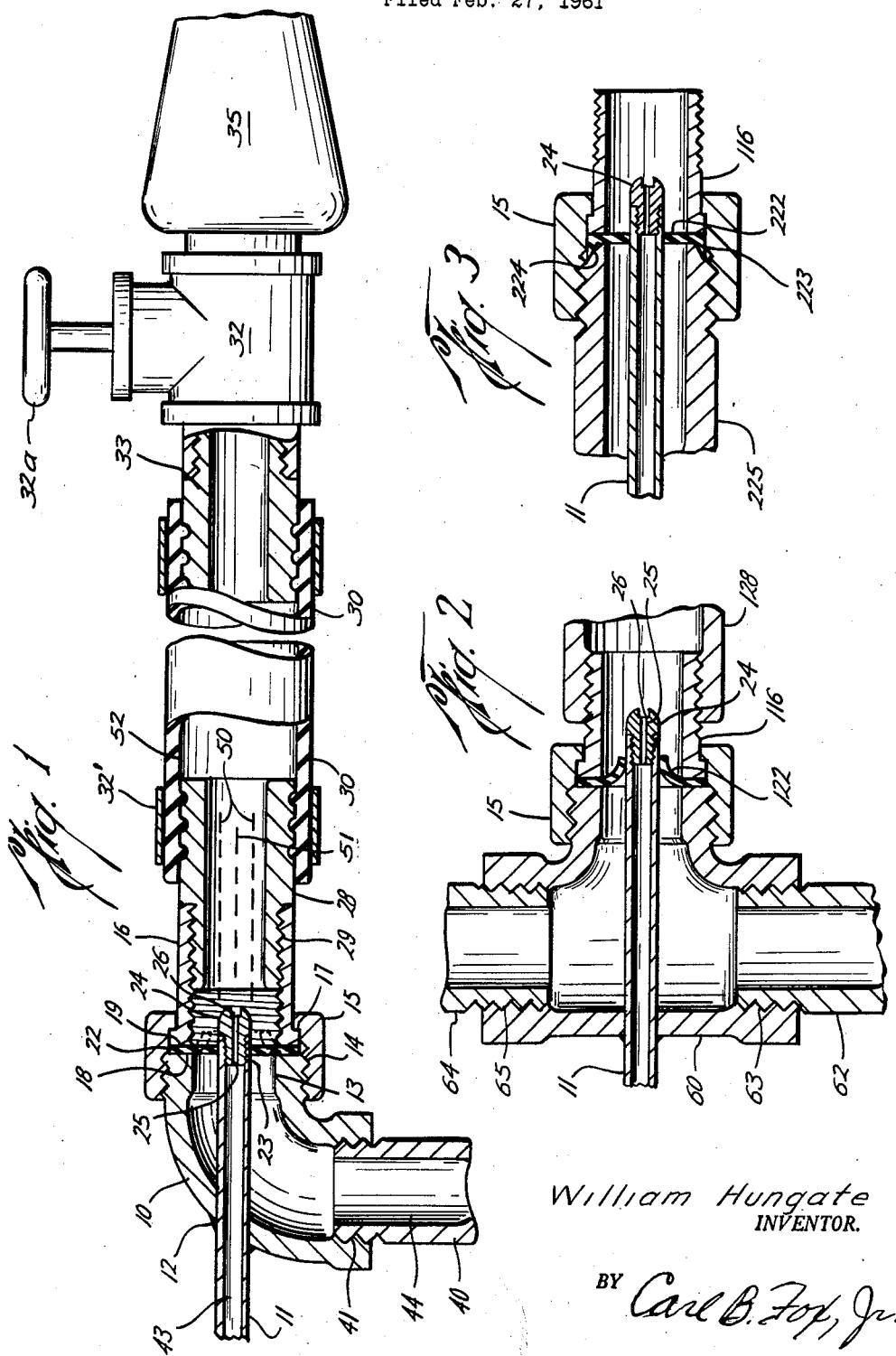
William Hungate
INVENTOR.
BY Carl B. Fox, Jr.
ATTORNEY

United States Patent Office 3,128,994
Patented Apr. 14, 1964

3,128,994
MIXING HEAD
William Hungate, West University Place, Tex.
(6320 Vanderbilt, Houston 5, Tex.)
Filed Feb. 27, 1961, Ser. No. 91,990
6 Claims. (Cl. 259—4)

This invention pertains to the mixing of liquids and particularly to the dispersion of a liquid of one amount in a second liquid of another amount. The invention contemplates mixing heads and spray nozzle equipment in which such mixing of liquids is performed.

A principal object of the invention is to provide an improved mixing head for use in mixing dissimilar liquids.

Another object of the invention is to provide such apparatus wherein the ratio of mixing of the two liquids may be maintained constant.

Briefly, the invention is to a novel form of apparatus for mixing liquids. One liquid to be dispersed in another liquid of greater amount or volume is introduced through an orifice or other restricted opening which is of a fixed size. The other liquid, herein sometimes called the carrier liquid, in larger amount, is introduced past a movable or flexible membrane which is held in a position about the conduit carrying the first named liquid. The membrane is disposed to be displaced by the pressure of the carrier liquid to an extent depending on the pressure of the carrier liquid. At the same time the liquid of lesser amount to be mixed therewith is increased in volume as the pressure increases. Therefore, the ratio of mixing may be maintained constant for a wide range of flow rates by proper design of equipment according to this invention.

Other objects and advantages of the invention will appear from the following detailed description of preferred embodiments of the invention, reference being made to the accompanying drawings of which:

FIGURE 1 is an axial sectional view through one form of apparatus according to the invention;

FIGURE 2 is a partial axial sectional view similar to FIGURE 1 showing a modified form of apparatus; and, FIGURE 3 is a partial view similar to FIGURES 1 and 2 showing a modified form of membrane according to the invention.

Referring now to the drawings in detail and first to FIGURE 1 thereof, L fitting 10 has disposed through an opening through its outer curved side a tube 11 which is welded or brazed in place at 12. Tube 11 extends through one end opening 13 of L 10 and concentrically thereof. L 10 is threaded exteriorly at 14 and a coupling 15 is screwed thereon to hold end-flanged fitting 16 at shoulder 17 thereof. Between the end 18 of L 10 and the end face 19 of fitting 16 there is disposed a rubber, or other elastomeric material, ring membrane 22 firmly and sealingly held in place by tightening of coupling 15 on the threads of the L. Membrane 22 is closely fitted around the exterior of tube 11 at the center opening of the membrane.

Tube 11 is interiorly threaded at 23 to receive a threaded flow orifice 24 having perforation 25 longitudinally thereof. A screw slot 26 is provided in the end of the flow orifice for screwing the orifice fitting into threads 23.

A hose coupling member 28 is screwed into interior threads 29 of fitting 16. A flexible rubber hose 30 or other suitable flow conduit is secured on hose coupling 28 by clamp ring 32 disposed therearound tightly. At the other end of hose 30 a quick-opening hand-operated valve 32 provided with hose connection 33 is connected to the hose. At the opposite side of valve 32 a nozzle 35 is suitably connected.

A liquid supply pipe 40 is screwed into threaded socket 41 of L 10. Thus fittings with associated tubular extensions such as hose 30 and pipe 40 may be described as the body.

A carrier liquid, or fluid, is supplied through pipe 40, usually in relatively larger amount, and a carried liquid, or fluid, is supplied through tube 11, usually in relatively smaller amount. The apparatus disperses the carried liquid in the carrier liquid in highly intermixed form. The amount of carried liquid that is delivered through opening 43 of tube 11 is determined by the pressure thereof related to the size of orifice opening 25 of orifice fitting 24. As the pressure of the carried liquid is increased, the amount delivered through the orifice is increased although not in direct ratio. The amount of carrier liquid delivered through opening 44 of pipe 40 and through the L 10 interior is related to the pressure of the carrier liquid which acts to displace and open up rubber membrane 22 about its central engagement with tube 11. As the pressure of the carrier liquid is increased, membrane 22 is increasingly displaced in the direction of flow by the fluid pressure to allow larger and larger quantities of the carrier liquid to pass the membrane.

Since the passage of carrier liquid, or gas, is confined to the area of displacement of membrane 22 about tube 11 the carrier liquid, or gas, passes into fitting 28 in the form of a tubular flow indicated by dash lines 50. The carried liquid, or gas, is passed through orifice 25 in a more or less straight line flow as indicated by dash line 51. Since both flows 50 and 51 are introduced into fitting 28 under high pressure through restricted openings, high degrees of dispersal and intimate intermixing of the flowing fluids results within fitting 28. When the fluid flow strikes the walls or end of fitting 28 or hose 30 connected therewith, the two liquids are intimately mixed with a high degree of dispersion of the carried liquid in the carrier liquid in very fine droplet form. The mixed fluids or liquids at 52 in the hose, valve 32 being opened by operation of handle 32a, flows through and out of the restricted end of nozzle 35 to be directed to be sprayed upon or against any desired object or into any desired space. Since at most rates of flow the liquid or gas flows through hose 30 and nozzle 35 will be turbulent, the mixture is maintained until the mixture is emitted from the nozzle end.

Although the opening about tube 11 is determined by the pressure of the carrier liquid, the opening does not increase directly proportionately as the pressure of the carrier fluid increases. This relation is the same as pertains to fluid in tube 11 emitted through orifice 25, a larger amount of either fluid being passed through the apparatus at higher pressure but not directly proportional with the increase of pressure. It has been found that when the pressures of the carrier and carried liquids are increased in the same ratio, the flow of each through the mixing head will increase in the same ratio so that a constant ratio mixture of the two liquids will be delivered at the nozzle. For example, if the carrier and carried liquids are at the same pressure, say 10 p.s.i.g., a certain proportion of one liquid to the other will be delivered through the nozzle. If the pressures of carried and carrier liquids are each doubled to 20 p.s.i.g., the amounts of each will be increased, but not doubled, but the ratio between the amounts of the two liquids in the mixture delivered will remain the same as at the 10 p.s.i.g. condition. Suppose, under different conditions, that the carrier liquid in pipe 40 is at 25 p.s.i.g. and the carried liquid in tube 11 is at 15 p.s.i.g., a certain volume ratio of the two liquids will be delivered at the nozzle. Increasing the carrier liquid to 50 p.s.i.g. and increasing the carried liquid pressure to 30 p.s.i.g., the amounts of each delivered will be increased about proportionately so that a liquid mixture of about the same proportion of each liquid as before will be delivered at the nozzle.

Referring now to the embodiment shown in FIGURE 2 of the drawings, the tube 11 is shown brazed or welded or otherwise suitably connected through a side of a pipe T 60 to extend through the stem part of the T. Tube 11 is equipped with orifice fitting 24 having orifice 25 and screw slot 26. Membrane 122 is of flared form to extend somewhat along the periphery of tube 11 in the direction of fluid flow. A pipe 62 is screwed into threads 63 of one arm of T 60 and a pipe 64 is screwed into threads 65 of the other arm of the T 60. Here, fitting or T 60 with associated members 62, 64 and 128 could be described as the body. Carrier liquid flows in (or out) through pipe 62 and out (or in) through pipe 64. Carried liquid flows through tube 11 as before. The T arrangement will permit interconnection of nozzles in series so that a large area may be sprayed or coated with the liquids emitted from the nozzles, since another T 60 (not shown) similarly equipped as that shown may be connected to the other end of pipe 64, etc., for any number of nozzles in a series. Pipe 64 may be also used to carry carrier liquid to other equipment for other purposes, such as for pressuring a supply of carried liquid to be delivered through tube 11, the carried liquid being contained in a collapsible bladder, or the like, and thereby subjected to the carrier liquid pressure. This arrangement when employed will permit equalization of the pressures of carrier and carried liquids. Membrane 122 will perform as described for membrane 22 of the FIGURE 1 embodiment, opening up about conduit or pipe 11 under increased carrier liquid pressure to permit increased carrier liquid flow. In FIGURE 2, hose connector 128 is screwed onto the exterior of flanged fitting 116 rather than the interior as in the FIGURE 1 embodiment.

Referring now to FIGURE 3 of the drawings, the membrane 222 has a flange formation 223 which is squeezed and held clamped by beveled end 224 of fitting 225, fitting 225 being one of the fittings 10 or 60 of the other embodiments, or the like, as desired, with tube 11 passing through said fitting as in FIGURE 1 or FIGURE 2. The circular flange formation of the membrane insures its correct positioning and sealed retention in place during operation of the apparatus.

The flexibility, or rigidity, of each of the membranes 22, 122, 222, is related to the material of which the membrane is made and to its relative dimensions, e.g. thickness. In the example above constant liquid ratios in the mixtures delivered at the nozzle were described. By making the membranes more or less flexible compared with the fluid pressures and the equipment dimensions, the ratio of mixed liquid may be made to be larger or smaller as the flow rates are changed. Thickening of membrane 22, for example, will increase its resistance to flow through L 10 whereby the amount of carrier liquid or gas may be made to increase less rapidly than the increase in flow rate of carried liquid or gas in tube 11. On the other hand, thinning of membrane 22 may make the carrier fluid flow increase more rapidly than the carried fluid flow. By proper design of the apparatus, the ratios to be obtained may be controlled at will.

The dispersion of one liquid in the other, i.e., the carried fluid in the carrier fluid, is greatly increased by the restriction of the carrier fluid flow at the membrane or flexible diaphragm, as it may be termed. In virtually all known mixing head and nozzle apparatus, the carrier fluid is admitted in substantially unrestricted flow and the carried fluid is admitted in restricted flow, as through an orifice. In this case, dispersion of the carried fluid in the carrier fluid depends almost entirely upon the turbulence in the equipment past the mixing point. However, in apparatus according to this invention, the dispersion is not so dependent, but, since both streams are admitted by restricted flow, adequate dispersion between the fluids is obtained regardless of lack of turbulence in fitting 28 and/or the hose 30 or other equipment secured to the mixing head. This dependable dispersion between the fluids results in superior operation of the apparatus over conventional types of mixing heads so that proper dispersion will occur at both large and small flows. Thus, the apparatus has a larger range of proper operation than has most such equipment.

While preferred embodiments of the invention have been shown and described, many modifications thereto may be made by a person skilled in the art without departing from the spirit of the invention, and it is intended to protect by Letters Patent all forms of the invention falling within the scope of the following claims.

I claim:

1. Apparatus for mixing fluids, comprising body means having a passage extending therethrough, one end of said passage serving as a first fluid inlet and the other end of said passage serving as a fluid outlet, a tubular means substantially smaller in outer diameter than said passage extending through a wall of said body from the exterior thereof and terminating at a point intermediate the length of said passage and at the center thereof, said tubular means having an orifice opening at its terminus within said passage directed toward said outlet, an elastomeric web disposed laterally of said terminus of said tubular means and sealingly secured to said body means therearound and resiliently engaged around said tubular means adjacent said terminus thereof, said web being resiliently proportionately displaced from engagement with said tubular means by increased fluid pressure at its side toward said inlet whereby with increased pressure of first fluid entering said body at said inlet for flow toward said outlet through said passage a proportionately increased flow thereof will occur, a second fluid entering the end of said tubular means exteriorly of said body and flowing therethrough to enter said passage of said body through said orifice, the amount of said second fluid flow being proportional to the pressure thereof within said tubular means, whereby by control of the relative pressures of said first and second fluids as described relative amounts of each entering and mixing in said passage and flowing therein toward said outlet may be controlled.

2. The combination of claim 1, said elastomeric web being flat.

3. The combination of claim 1, said elastomeric web being flared along the length of said tubular means in the opposite direction to the direction of fluid flow through said passage.

4. The combination of claim 1, said elastomeric web having a flange therearound, said body means including means for sealingly clamping said flange to hold said web in place.

5. The combination of claim 1, said body including a pipe L fitting, said tubular means being straight and entering said body through a wall of said L.

6. The combination of claim 1, said body including a pipe T fitting having opposed arm portions and a stem, said tubular means being straight and entering said body through said T opposite said stem and between the said opposed arm portions.

References Cited in the file of this patent

UNITED STATES PATENTS

| | | |
|---|---|---|
| 2,391,422 | Jackson | Dec. 25, 1945 |
| 2,401,914 | Di Pietro | June 11, 1946 |
| 2,894,732 | Taber et al. | July 14, 1959 |
| 2,969,748 | Staats et al. | Jan. 31, 1961 |